United States Patent
Byron

(10) Patent No.: US 10,450,730 B2
(45) Date of Patent: Oct. 22, 2019

(54) UNIVERSAL FAUCET HANDLES

(71) Applicant: BrassCraft Manufacturing Company, Novi, MI (US)

(72) Inventor: David Jonathan Byron, Southfield, MI (US)

(73) Assignee: BrassCraft Manufacturing Company, Novi, MI (US)

( * ) Notice: Subject to any disclaimer, the term of this patent is extended or adjusted under 35 U.S.C. 154(b) by 45 days.

(21) Appl. No.: 15/497,689

(22) Filed: Apr. 26, 2017

(65) Prior Publication Data

US 2018/0313067 A1 Nov. 1, 2018

(51) Int. Cl.
*E03C 1/04* (2006.01)
*F16K 31/60* (2006.01)
*B25G 3/12* (2006.01)

(52) U.S. Cl.
CPC .............. *E03C 1/0412* (2013.01); *B25G 3/12* (2013.01); *F16K 31/60* (2013.01); *Y10T 403/7056* (2015.01)

(58) Field of Classification Search
CPC .......... E03C 1/0412; E05B 3/003; E05B 3/04; E05B 3/10; F16K 31/60; F16K 31/605; B25G 3/20; B25G 3/22; B25G 3/24; B25G 3/02; B25G 3/04; B25G 3/10; B25G 3/12; Y10T 403/7056; Y10T 403/7058
See application file for complete search history.

(56) References Cited

U.S. PATENT DOCUMENTS

| 1,433,381 | A | * | 10/1922 | Kirkpatrick | B25G 3/12 |
| | | | | | 16/108 |
| 1,635,961 | A | * | 7/1927 | Rowe | B25G 3/02 |
| | | | | | 403/248 |
| 1,797,194 | A | * | 3/1931 | Knapp | F16G 11/048 |
| | | | | | 403/370 |
| 2,685,466 | A | | 8/1954 | Middelton | |
| 3,929,317 | A | | 12/1975 | Cohn et al. | |
| 4,249,426 | A | * | 2/1981 | Erikson | F16B 39/36 |
| | | | | | 411/262 |
| 4,565,350 | A | | 1/1986 | Rozek | |
| 4,593,430 | A | | 6/1986 | Spangler et al. | |
| 4,683,610 | A | * | 8/1987 | Richards | B05C 17/0205 |
| | | | | | 15/144.4 |

(Continued)

*Primary Examiner* — Emily M Morgan
(74) *Attorney, Agent, or Firm* — Reising Ethington P.C.

(57) ABSTRACT

Handle assemblies for coupling to a shaft are provided. Each assembly includes a handle having an end wall with a fastener passage extending therethrough and a side wall extending from the end wall to an open end. In one embodiment, an adapter assembly includes a nut, a collet having a fastener portion carrying the nut and a compression portion receiving the shaft, and a clamp mounted on the compression portion and tightened around the compression portion to compress the collet to the shaft. A fastener extends through the fastener passage and into the nut. In another embodiment, the handle defines a conical pocket in communication with the fastener passage. An adapter in the pocket includes circumferentially spaced jaws having conical outer surfaces and inner surfaces engaging the shaft and hinged connectors extending circumferentially between adjacent jaws. A fastener extends through the fastener passage and into the shaft.

18 Claims, 5 Drawing Sheets

(56) References Cited

U.S. PATENT DOCUMENTS

| | | | | |
|---|---|---|---|---|
| 4,722,634 | A | * | 2/1988 | Malish ................... B25G 3/04 403/299 |
| 4,794,945 | A | | 1/1989 | Reback |
| 5,025,826 | A | | 6/1991 | Schoepe et al. |
| 5,027,671 | A | * | 7/1991 | Erikson ............... F16H 25/2009 411/270 |
| 5,216,781 | A | | 6/1993 | Brondfield |
| 6,178,981 | B1 | | 1/2001 | Wales |
| 7,437,857 | B1 | * | 10/2008 | Maguire .................. A45F 3/44 182/87 |
| 7,987,869 | B2 | | 8/2011 | Rosko et al. |
| 8,266,767 | B1 | | 9/2012 | Huang |
| 9,255,387 | B2 | | 2/2016 | Yang et al. |
| 9,334,636 | B1 | | 5/2016 | Finegan, Jr. |
| 2002/0172548 | A1 | * | 11/2002 | Chang ..................... B25G 3/22 403/305 |
| 2010/0140530 | A1 | | 6/2010 | Robison |
| 2011/0180155 | A1 | | 7/2011 | Shantzis |
| 2016/0201304 | A1 | | 7/2016 | Doss et al. |

* cited by examiner

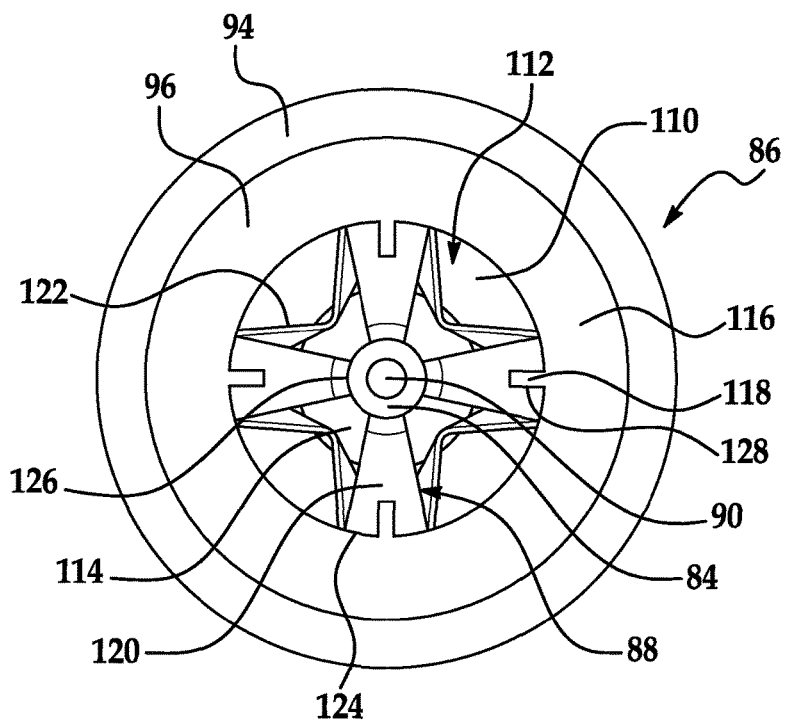
FIG. 8
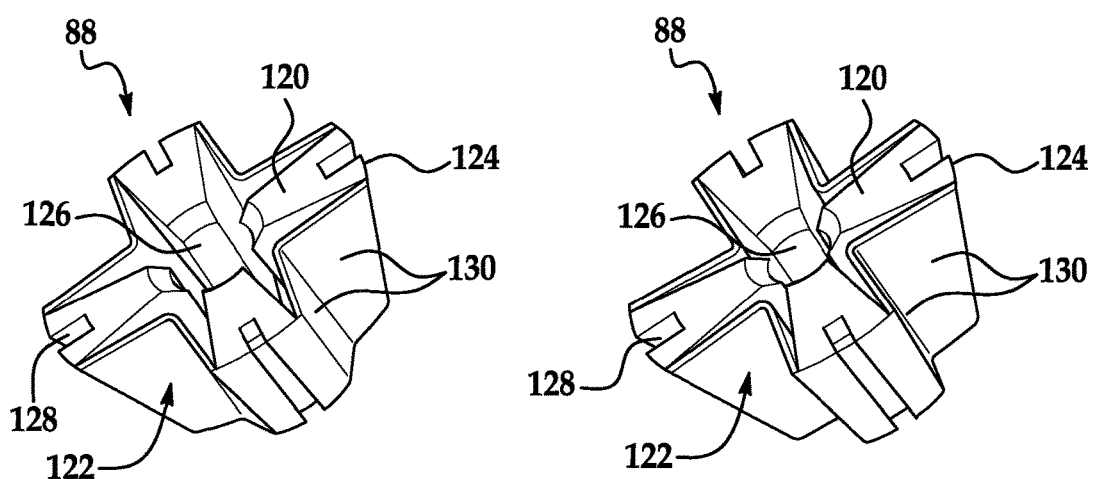
FIG. 9
FIG. 10

UNIVERSAL FAUCET HANDLES

BACKGROUND a. Field

This disclosure relates generally to handle assemblies configured for coupling to a shaft. More specifically, this disclosure pertains to handle assemblies that are configured for attachment to shafts despite variations in the size of the shaft and the form of the handle.

b. Background Art

Handles for use in rotating shafts are used in a variety of applications. In faucets used in kitchen and bathroom sinks, tubs and showers, for example, faucet handles allow users to rotate a valve stem used to control the flow of water. Faucet handles are provided in a wide variety of forms in order to meet functional and aesthetic objectives. Further, the valve stems to which the handles are attached may vary in size. As a result, it is often necessary to produce multiple versions of any given faucet handle to accommodate potential uses of the handle. Alternatively, mechanisms can be employed to adapt a faucet handle to different valve stems. Existing mechanisms, however, are often relatively complex and expensive to implement.

The inventors herein have recognized a need for a handle assembly that will overcome one or more of the above-identified deficiencies.

BRIEF SUMMARY

A handle assembly configured for coupling to a shaft is provided. In particular, a handle assembly is provided that enables attachment of a handle to a shaft despite variations in the size and form of the handle and shaft.

A handle assembly configured for coupling to a shaft in accordance with one embodiment includes a handle having an end wall with a fastener passage extending therethrough and a side wall extending away from the end wall to an open end. The handle assembly further includes an adapter assembly. The adapter assembly includes a nut, a collet having a compression portion configured to receive the shaft and a fastener portion configured to carry the nut; and a clamp configured for mounting on the compression portion and to be tightened around the compression portion to compress the collet to the shaft. The handle assembly further includes a fastener configured to extend through the fastener passage and to threadingly couple to the nut.

A handle assembly configured for coupling to a shaft in accordance with another embodiment includes a handle having an end wall with a fastener passage extending therethrough and a side wall extending away from the end wall to an open end and defining a conical pocket in communication with the fastener passage. The handle assembly further includes an adapter configured to be received within the conical pocket. The adapter has a plurality of circumferentially spaced jaws having conical outer surfaces and inner surfaces configured to engage the shaft and hinged connectors extending circumferentially between adjacent jaws of the plurality of circumferentially spaced jaws. The handle assembly further includes a fastener configured to extend through the fastener passage and to threadingly couple to the shaft.

The foregoing and other aspects, features, details, utilities, and advantages of the disclosed embodiments will be apparent from reading the following description and claims, and from reviewing the accompanying drawings.

BRIEF DESCRIPTION OF THE DRAWINGS

FIG. 8 is a plan view of the handle assembly of FIG. 5.

FIGS. 9-10 are perspective views of an adapter of the handle assembly of FIG. 5.

DETAILED DESCRIPTION

Figure 1:
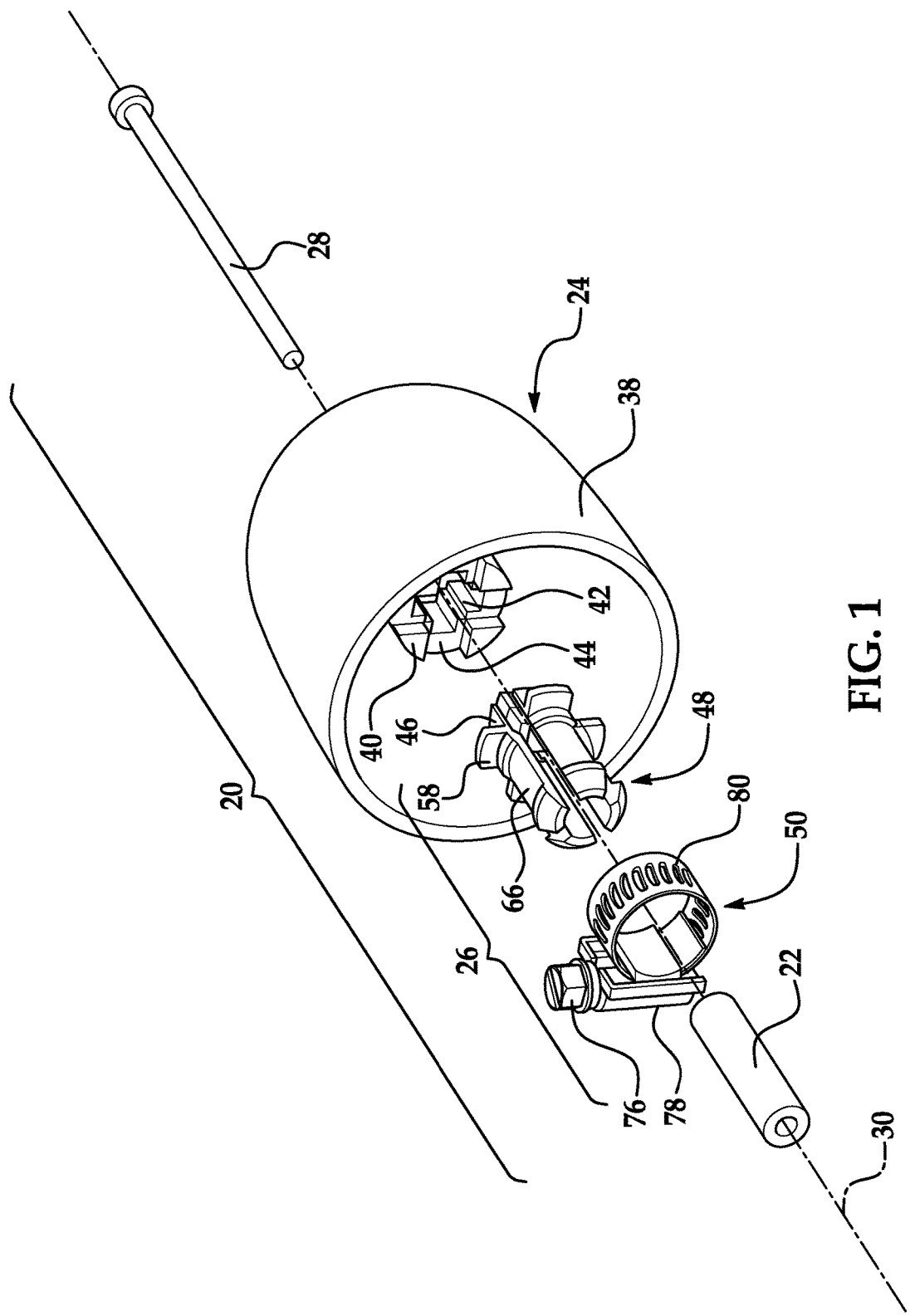
FIG. 1 is an exploded perspective view of one embodiment of a handle assembly configured for coupling to a shaft.
Figure 2:
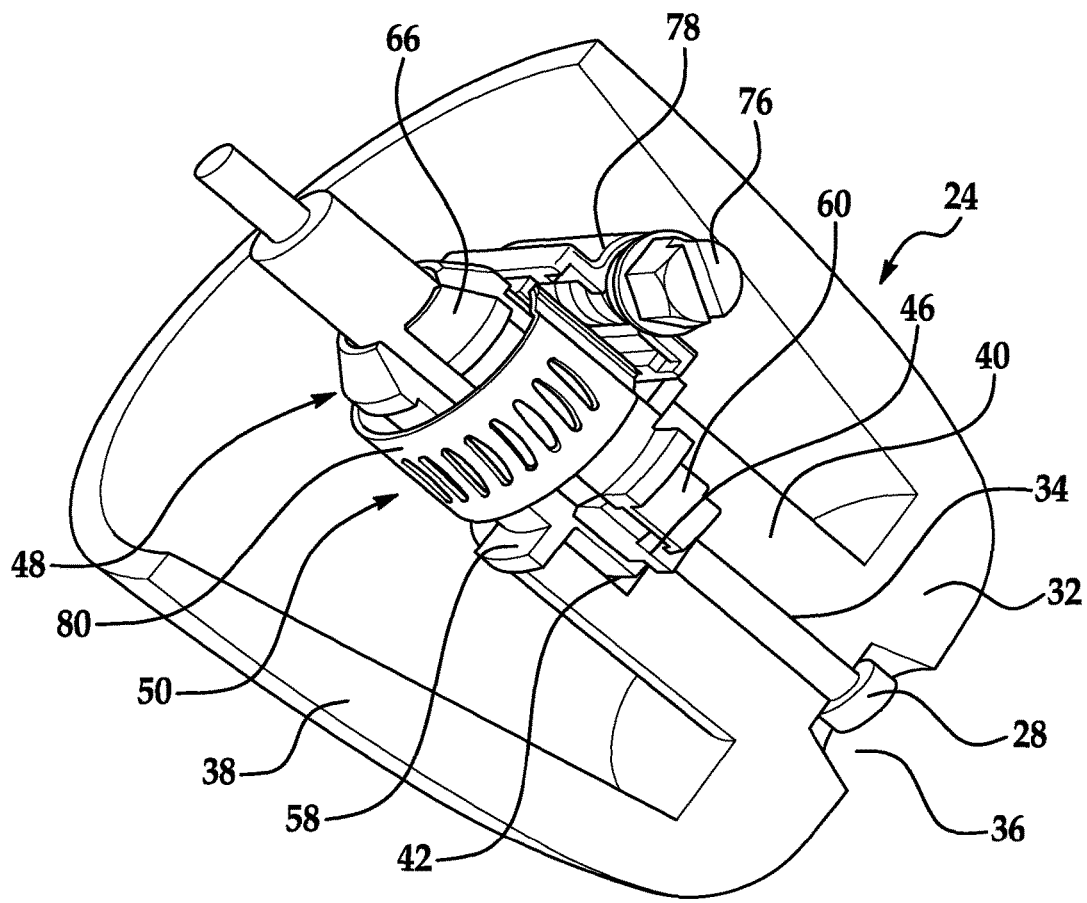
FIG. 2 is a partial cross-sectional view of the handle assembly of FIG. 1.

Referring now to the drawings wherein like reference numerals are used to identify identical components in the various views, FIGS. 1-2 illustrate one embodiment of a handle assembly 20 for coupling to a shaft 22. In accordance with certain embodiments of the invention, shaft 22 may comprise a faucet stem and handle assembly 20 may be adapted for use as a faucet handle for rotating the faucet stem and controlling the flow of water in a bathroom or kitchen sink, a tub or a shower. Handle assembly 20 includes a handle 24, an adapter assembly 26 and a fastener 28.

Handle 24 provides a surface that can be gripped by a hand or tool in order to rotate shaft 22 about an axis 30. Referring to FIG. 2, handle 24 defines an end wall 32 at one axial end of handle 24. End wall 32 includes a fastener passage 34 extending through end wall 32 and configured to receive fastener 28. End wall 32 may define a fastener recess 36 on an exterior side of end wall 32 that is configured to receive a head of fastener 28. A removable cap (not shown) may enclose recess 36 for aesthetics and/or to limit or prevent contact between fastener 28 and moisture in surrounding environment. Handle 24 further includes a side wall 38 that extends axially from end wall 32 to an open end and defines an interior of handle 24. In the illustrated embodiment, side wall 38 is generally conical in shape. It should be understood, however, that the shape of end wall 32 and side wall 38 may vary. Handle 24 further defines a boss 40 that extends axially away from end wall 32 within the interior of handle 24. Boss 40 is spaced radially inwardly from side wall 38 and may be centered within the interior of handle 24. Boss 40 is configured to engage adapter assembly 26. Fastener passage 34 extends through boss 40. Boss 40 defines a cavity 42 that is communication with fastener passage 34 and is configured to receive a portion of adapter assembly 26 as described in greater detail below. Referring to FIG. 1, one axial end of boss 40 distant from end wall 32 defines a plurality of circumferentially spaced recesses 44 configured to receive another portion of adapter assembly 26 as described in greater detail below. Recesses 44 axially locate assembly 26 and prevent rotation of assembly 26 about axis 30.

Adapter assembly 26 couples handle 24 to shaft 22. In accordance with the present teachings, adapter assembly 26 can be used to couple handles 24 having various forms to shafts 22 of various sizes. Assembly 26 includes a nut 46, a collet 48 and a clamp 50.

Nut 46 cooperates with fastener 28 to secure handle 24 to shaft 22. Nut 46 defines a bore with an internal thread configured to engage corresponding threads on fastener 28. Nut 46 is supported on and retained by collet 48 as described in greater detail below. Upon assembly, nut 46 is disposed within cavity 42 in boss 40 of handle 24.

Figure 3:
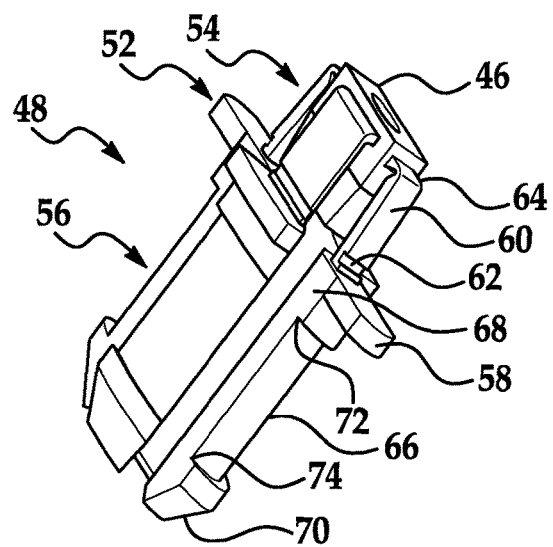
FIGS. 3-4 are perspective views of a collet of the handle assembly of FIGS. 1-2.
Figure 4:
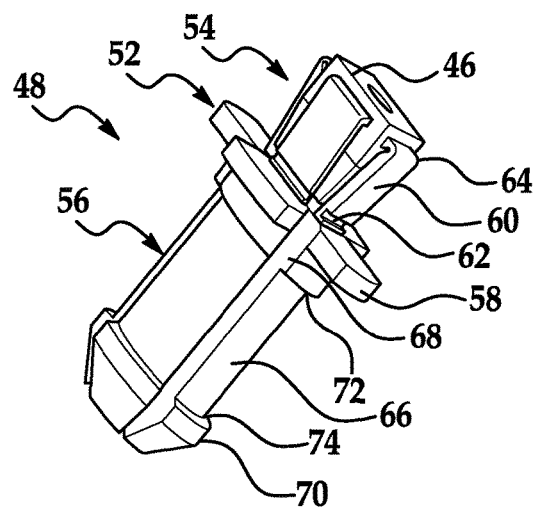

Collet 48 is provided to carry nut 46 and to couple handle 24 to shaft 22. Collet 48 may be made from polymeric materials. Referring to FIGS. 3-4, collet 48 includes a base flange 52 from which a fastener portion 54 and a compression portion 56 extend. Base flange 52 is disposed between fastener portion 54 and compression portion 56 and is configured to engage boss 40 in handle 24. In the illustrated embodiment, flange 52 includes a plurality of circumferentially spaced members 58. Each member 58 is configured to be received within a corresponding recess 44 in boss 40 in order to axially locate collet 48 and limit axial and radial movement of collet 48 relative to boss 40. Fastener portion 50 is provided to retain and carry nut 46. Fastener portion 50 may include a plurality of circumferentially spaced arms 60. Each arm 60 is connected at a first end 62 to base flange 52 and may be integrally formed with base flange 52 (i.e., as a unitary or one-piece structure). End 62 of each arm 60 may form a living hinge with base flange 52 such that arms 60 are capable of pivoting to allow insertion and removal of nut 46 between arms 60. An opposite end 64 of each arm is configured to engage a corresponding side of nut 46 in order to inhibit release of nut 46. Upon assembly, arms 60 are located together with nut 46 within cavity 42 of boss 40. Compression portion 56 is configured to receive shaft 22 and may likewise include a plurality of circumferentially spaced arms 66. Each arm 66 is again connected to base flange 52 and may be integrally formed with base flange 52 (i.e., as a unitary or one-piece structure). One end 68 of each arm 66 may again form a living hinge with base flange 52 such that arms 66 are capable of pivoting to grip and release shaft 22. An opposite end 70 of each arm 66 may include a beveled edge to facilitate insertion of shaft 22 between arms 66. Each arm 66 is formed on a radially outer side to include opposed shoulders 72, 74. Shoulders 72, 74 are sized to receive clamp 50 therebetween and to engage opposite axial ends of clamp 50.

Referring again to FIGS. 1-2, clamp 50 is provided to compress compression portion 56 of collet 48 onto shaft 22 and to inhibit movement of collet 48 relative to shaft 22. Clamp 50 may comprise a hose clamp. Clamp 50 includes a screw 76, a screw housing 78 and a band 80 into which a screw thread pattern may be cut or pressed. Band 80 has a fixed end fixed to screw housing 78 and a free end that may be fed back into screw housing 78 and engaged by screw 76. Rotation of the screw 76 is then used to increase or reduce the diameter of the band 76 in order decompress or compress, respectively, compression portion 56 of collet 48 about shaft 22. Band 80 is configured to be received between shoulders 72, 74 on each arm 66 of compression portion 56.

Fastener 28 threadingly couples to nut 46 in order to couple handle 24 to adapter assembly 26. Fastener 28 may comprise a screw. Referring to FIG. 2, fastener 28 is configured to be inserted through fastener passage 34 in end wall 32 of handle 24 to a depth such that a head of fastener 28 is received within recess 36 and the body of fastener 28 extends into cavity 42 in boss 40 and into the threaded bore in nut 46. Fastener 28 is rotated until handle 24 is tightened against nut 46 and collet 48 of adapter assembly 26.

A method of assembling handle assembly 20 to shaft 22 may begin with the step of assembling nut 46 and collet 48. Referring to FIGS. 3-4, this step may include the substeps of deflecting arms 60 of fastener portion 54 of collet 48 and inserting nut 46 between arms 60. The method may continue with the step of coupling the subassembly comprising nut and collet 48 to shaft 22. It should be understood, however, that in an alternative embodiment, collet 48 may be coupled to shaft 22 before the step of assembling nut 46 and collet 48. The step of coupling collet 48 to shaft 22 may include the substeps of aligning shaft 22 with compression portion 56 of collet 48 and inserting shaft 22 between arms 66 of portion 56. Referring to FIGS. 1-2, the method may continue with the step of positioning clamp 50 about compression portion 56 of collet 48. It should again be understood, however, that clamp 50 may alternatively be positioned about compression portion 56 of collet 48 prior to the step of coupling collet 48 to shaft 22. The method may continue with the step of tightening clamp 50 to compress portion 56 about shaft 22. Once adapter assembly 26 is fully assembled and coupled to shaft 22, the method may continue with the step of positioning handle 24 relative to shaft 22 and adapter assembly 26. This step may include the substeps of aligning recesses 44 in boss 40 with members 58 in base flange 52 of collet 48 and advancing handle 24 until members 58 are disposed within recesses 44—and nut 46 is disposed with cavity 42—in boss 40 of handle 24. The method may conclude with the step of inserting fastener 28 through fastener passage 34 in handle 24 and into nut 46 to tighten handle 24 against adapter assembly 26.

Figure 5:
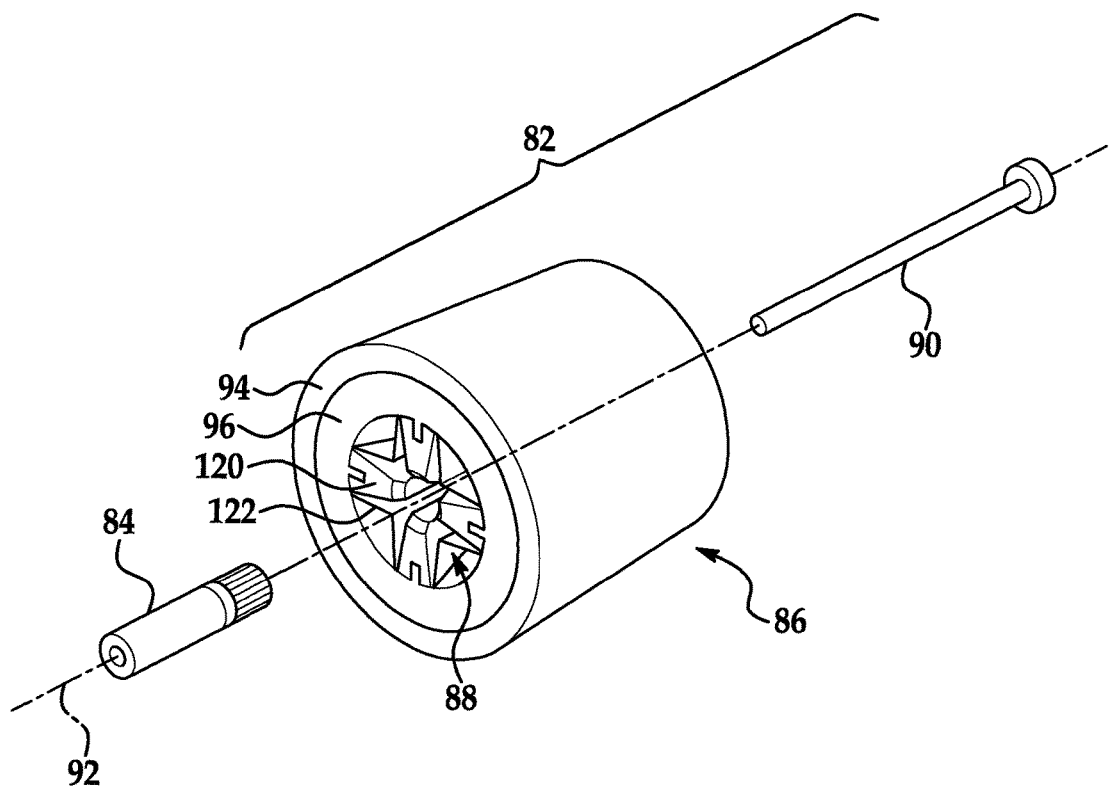
FIG. 5 is an exploded perspective view of another embodiment of a handle assembly configured for coupling to a shaft.

Referring now to FIG. 5, another embodiment of a handle assembly 82 for coupling to a shaft 84 is illustrated. In accordance with certain embodiments of the invention, shaft 84 may again comprise a faucet stem and handle assembly 82 may be adapted for use as a faucet handle for rotating the faucet stem and controlling the flow of water in a bathroom or kitchen sink, a tub or a shower. Although shaft 84 has a cylindrical shape having a rounded or curved outer surface in the illustrated embodiment, it should be understood that shaft 84 may assume a variety of shapes including a square shape or other shapes that define one or more corners. Handle assembly 82 includes a handle 86, an adapter 88 and a fastener 90.

Handle 86 provides a surface that can be gripped by a hand or tool in order to rotate shaft 84 about an axis 92. Handle 86 may include a body 94 and an insert 96 that is configured to be received within and carried by body 94. It should be understood, however, that body 94 and insert 96 could alternatively be formed as unitary (one-piece) structure.

Figure 7:
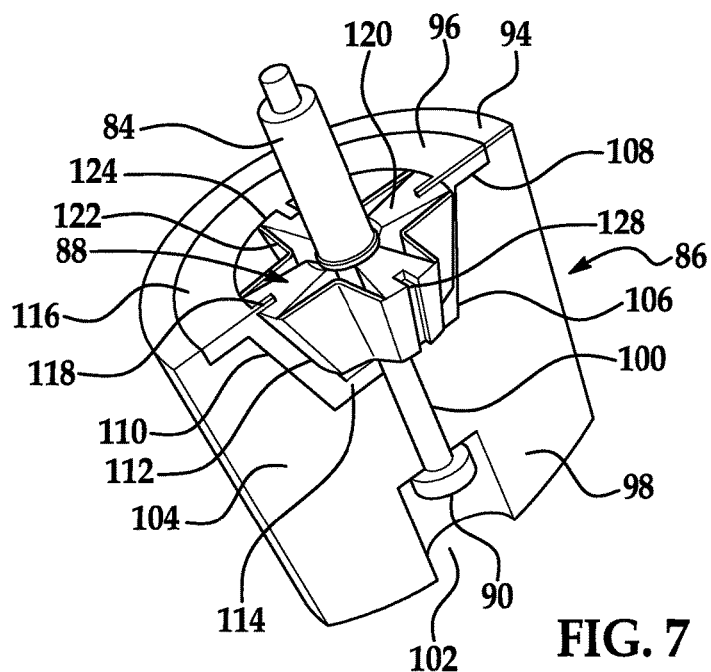
FIG. 7 is a cross-sectional view of the handle assembly of FIG. 5.

Referring to FIG. 7, body 94 defines an end wall 98 at one axial end of handle 86. End wall 98 includes a fastener passage 100 extending through end wall 98 and configured to receive fastener 90. End wall 98 may define a fastener recess 102 on an exterior side of end wall 98 that is configured to receive a head of fastener 90. A removable cap (not shown) may enclose recess 102 for aesthetics and/or to limit or prevent contact between fastener 90 and moisture in surrounding environment. Body 94 further includes a side wall 104 that extends axially from end wall 98 to an open end and defines an interior of handle 86. In particular, side wall 104 defines a conical cavity 106 that is in communication with fastener passage 100 at one end and terminates at an opposite end in a counterbore 108 formed at the open end of body 94 and handle 86. Cavity 106 and counterbore 108 are configured to receive insert 94.

Figure 6:
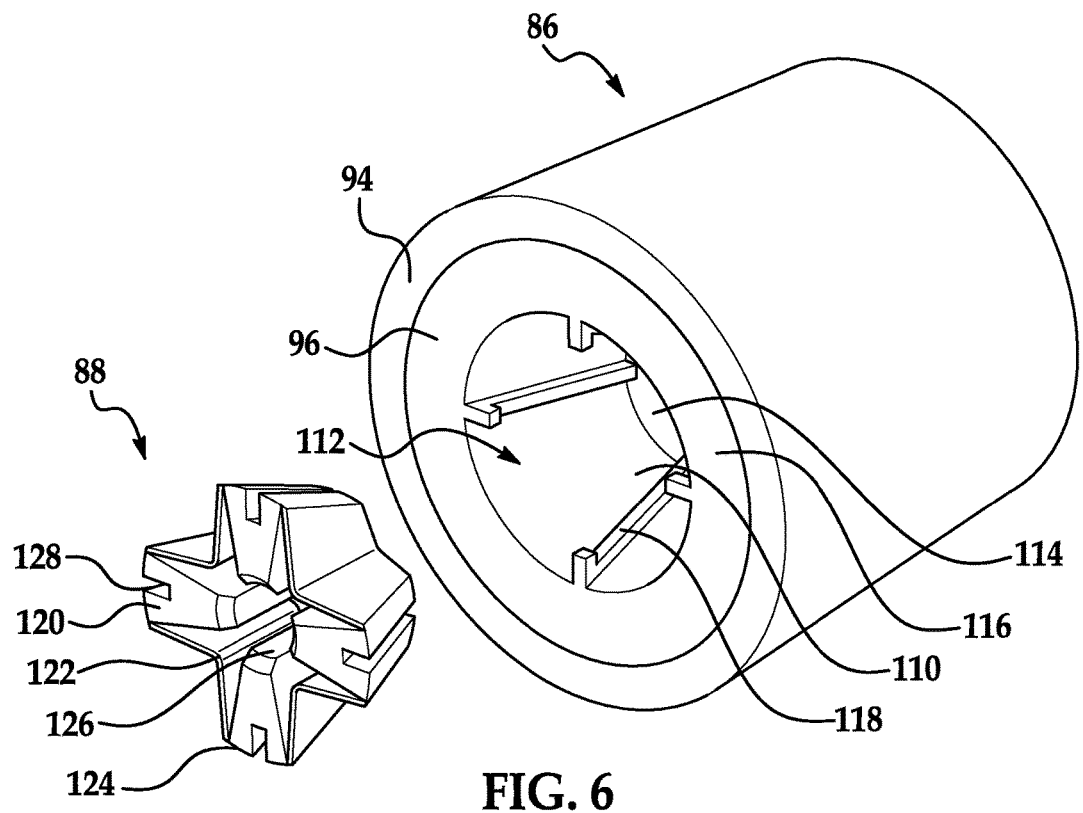
FIG. 6 is an exploded perspective view of a handle and adapter subassembly of the handle assembly of FIG. 5.

Insert 96 is configured to align and retain adapter 88. Referring to FIGS. 6-8, insert 96 has a conical side wall 110 and defines a conical pocket 112 in which adapter 88 is disposed. Insert 96 includes a radially inwardly extending end wall 114 disposed at one end of side wall 110. End wall 114 includes a bore configured for alignment with fastener passage 100 in body 94 and through which fastener 90 may extend. Insert 96 also includes a radially outwardly extending flange 116 disposed at an opposite end of side wall 110 and configured to be received within counterbore 108 such that the open end of insert 96 is flush with the open end of body 94. Insert 96 further defines a plurality of circumferentially spaced, radially inwardly extending fins 118 extending from side wall 110 that are configured to engage adapter 88. Referring to FIG. 6, fins 118 may be substantially L-shaped in cross section with a long leg extending along at least a portion of the length of side wall 110 and a short leg disposed proximate the open end of insert 96 and projecting radially inwardly opposite flange 116.

Adapter 88 couples handle 86 to shaft 84. In accordance with the present teachings, adapter 88 can be used to couple handles 86 having various forms to shafts 84 of various sizes. Adapter 88 is configured to be received within the conical pocket formed in insert 96 of handle 86. Referring to FIGS. 9-10, adapter 88 includes a plurality of circumferentially spaced jaws 120 connected by hinged connectors 122.

Each jaw 120 tapers moving from a radially outer surface 124 to a radially inner surface 126. Outer surface 124 has a substantially conical shape and is adapted to engage the conical surface formed in side wall 110 of insert 96. Inner surface 126 may be substantially concave in shape and is configured to engage shaft 84. Each jaw may further define a slot 128 configured to receive a corresponding fin 118 upon insertion within insert 96 of handle 86 as show in FIGS. 7-8. Referring again to FIGS. 9-10, slots 128 may have a shape that is complementary to the shape of fins 118. Accordingly, in the illustrated embodiment, slots 128 are substantially L-shaped with a long leg extending in a substantially axial direction along the length of adapter 88 and a short leg extending inwardly in a substantially radial direction and located at one axial end of adapter 88.

Connectors 122 couple jaws 120 and enable radial movement of jaws 120 to increase or decrease a diameter of adapter 88. Connectors 122 extend circumferentially between circumferentially adjacent jaws 120. Each connector may include a pair of leaves 130. Each leaf 130 has one circumferential end connected to a corresponding jaw 120 and forming a hinge with the jaw 120. Each leaf 130 has another circumferential end connected to the other leaf 130 and forming a hinge with the other leaf 130. The circumferential ends of the leaves 130 that are connected to jaws 120 (and the hinges formed with jaws 120) may be located further outward radially than the circumferential ends that are connected to an adjoining leaf 130 (and the hinges formed between adjacent leaves 130) and may be connected to jaws 120 at or proximate to outer surface 124 of each jaw 120. Because jaws 120 are circumferentially spaced from one another and capable of radially inward and outward movement through connectors 122, adapter 88 is capable of receiving shafts in various shapes and sizes. For example, adapter 88 is capable of coupling a handle 86 to a square shaft with the inner surface 126 of each jaw 120 engaging a flat of the square shaft and the corners of the square shaft disposed between circumferentially adjacent jaws 120.

Referring again to FIG. 7, fastener 90 threadingly couples to shaft 84 in order to couple handle assembly 82 to shaft 84. Fastener 90 may comprise a screw. Fastener 90 is configured to be inserted through fastener passage 100 in end wall 98 of body 94 and through the aligned bore in insert 96 and then inserted within a threaded bore in shaft 84. The head of fastener 90 is received within recess 102. As fastener 90 is rotated, shaft 84 and adapter 88 are drawn further into the conical pocket 112 formed in insert 96 of handle 86. This movement forces jaws 120 radially inward against shaft 84 to tighten handle assembly 82 onto shaft 84.

A method of assembling handle assembly 82 to shaft 84 may begin with the step of aligning adapter 88 with insert 96 such that slots 128 in jaws 120 of adapter 88 are aligned with fins 118 in insert 96. The method may further include the step of compressing adapter 88 to reduce the diameter of adapter 88 prior to insertion within insert 96. It should be understood that the alignment and compression steps could be performed in any order. The method may continue with the step of inserting adapter 88 into the conical pocket 112 in insert 96 of handle 86 such that the outer surface 124 of each jaw 120 engages side wall 110 and an axial end of adapter 88 is spaced from end wall 114 of insert 96. In a subsequent step, the subassembly of the handle 86 and adapter 88 may be mounted to shaft 84 such that the inner surfaces 126 of each jaw 120 face the radially outer surface of shaft 84. In certain embodiments, surfaces 126 may engage the radially outer surface of shaft 84. The method may continue with the step of inserting fastener 90 through fastener passage 100 in end wall 98 of handle 86 and into a threaded bore in shaft 84. Thereafter, fastener 90 may be rotated to draw handle 86 further onto shaft 84. This action also draws adapter 88 towards end wall 114 in insert 96. Because the outer surface 124 of each jaw 120 engages side wall 110 of insert 96 and because the side wall 110 tapers towards end wall 114 of insert 96, the movement of adapter 88 towards end wall 114 radially compresses jaws 120 against shaft 84.

A handle assembly 20 or 82 for coupling to a shaft 22 or 84 in accordance with the present teachings is advantageous relative to conventional handle assemblies. In particular, the inventive assemblies 20 and 82 enable attachment of a handle 24 or 86 to a shaft 22 or 84 despite variations in the size and form of the handle 24 or 86 and shaft 22 or 84 and do so in a way that is less complex and less expensive than conventional handle assemblies.

While the invention has been shown and described with reference to one or more particular embodiments thereof, it will be understood by those of skill in the art that various changes and modifications can be made without departing from the spirit and scope of the invention.

I claim:

1. A handle assembly configured for coupling to a shaft, comprising:
   a handle having an end wall with a fastener passage extending therethrough and a side wall extending away from the end wall to an open end;
   an adapter assembly including
      a nut,
      a collet having a compression portion configured to receive the shaft and including a plurality of circumferentially spaced arms having a base flange, and a fastener portion configured to carry the nut, and
      a clamp configured for mounting on the compression portion and to be tightened around the compression portion to compress the collet to the shaft; and
   a fastener configured to extend through the fastener passage and to threadingly couple to the nut.

2. The handle assembly of claim 1 wherein the handle includes a boss extending away from the end wall and spaced radially inwardly from the side wall, the boss configured to engage the adapter assembly.

3. The handle assembly of claim 2, wherein the base flange is between the compression portion and fastener portion, the base flange configured to engage the boss.

4. The handle assembly of claim 3, wherein the boss defines a plurality of circumferentially spaced recesses.

5. The handle assembly of claim 2 wherein the fastener passage extends through the boss.

6. The handle assembly of claim 2 wherein the boss defines a cavity configured to receive the nut and the fastener portion of the collet.

7. The handle assembly of claim 1 wherein the fastener portion includes a plurality of circumferentially spaced arms.

8. The handle assembly of claim 7 wherein each of the plurality of circumferentially spaced arms defines a living hinge at one end.

9. The handle assembly of claim 1 wherein the compression portion defines first and second shoulders configured to engage opposite axial ends of the clamp.

10. The handle assembly of claim 1 wherein the shaft is a faucet stem and the handle is a faucet handle.

11. The handle assembly of claim 1, wherein the nut has a bore with an internal thread.

12. The handle assembly of claim 1, wherein
the handle includes a boss extending away from the end wall of the handle and having a cavity in communication with the fastener passage and also having an axial end with a plurality of circumferentially spaced recesses.

13. A handle assembly, comprising:
a handle including an end wall with a fastener passage extending therethrough and a side wall extending away from the end wall to an open end and defining an interior of the handle; and
an adapter assembly configured to be coupled to the handle, and including:
a collet having a compression portion, and including a plurality of circumferentially spaced pivotable arms having a base flange, and a fastener portion;
a nut having a bore with an internal thread and configured to be carried by the fastener portion of the collet; and
a clamp configured to be carried by the compression portion of the collet.

14. The handle assembly of claim 13 wherein the fastener portion of the collet includes a plurality of circumferentially spaced pivotable arms to facilitate insertion and removal of the nut.

15. The handle assembly of claim 13 wherein the compression portion of the collet defines first and second shoulders configured to engage opposite axial ends of the clamp.

16. The handle assembly of claim 13 wherein the handle includes a boss extending away from the end wall of the handle within the interior of the handle, being spaced radially inwardly from the side wall of the handle, and having a cavity in communication with the fastener passage, and wherein the fastener portion of the collet and the nut are configured to be received in the cavity of the boss of the handle.

17. The handle assembly of claim 13 wherein the handle includes a boss extending away from the end wall of the handle within the interior of the handle, being spaced radially inwardly from the side wall of the handle, and having an axial end with a plurality of circumferentially spaced recesses, and wherein the base flange is configured to be correspondingly received in the recesses of the boss of the handle.

18. A handle assembly, comprising:
a handle including:
an end wall with a fastener passage extending therethrough;
a side wall extending away from the end wall to an open end and defining an interior of the handle; and
a boss extending away from the end wall of the handle within the interior of the handle, being spaced radially inwardly from the side wall of the handle, having a cavity in communication with the fastener passage, and having an axial end with a plurality of circumferentially spaced recesses; and
a collet including a plurality of arms, the arms including:
a base flange having a plurality of circumferentially spaced members configured to be correspondingly received in the recesses of the boss of the handle;
a compression portion extending in a direction away from the base flange and having a plurality of circumferentially spaced pivotable arms; and
a fastener portion extending in an opposite direction away from the base flange, and configured to be received in the cavity of the boss of the handle.

* * * * *